United States Patent
Lazzarini

(10) Patent No.: US 7,510,022 B2
(45) Date of Patent: Mar. 31, 2009

(54) FIRE-SUPPRESSION SYSTEM FOR AN AIRCRAFT

(75) Inventor: Anthony K. Lazzarini, Seattle, WA (US)

(73) Assignee: The Boeing Company, Chicago, IL (US)

( * ) Notice: Subject to any disclaimer, the term of this patent is extended or adjusted under 35 U.S.C. 154(b) by 341 days.

(21) Appl. No.: 11/475,270

(22) Filed: Jun. 26, 2006

(65) Prior Publication Data

US 2008/0314603 A1 Dec. 25, 2008

Related U.S. Application Data

(62) Division of application No. 10/786,285, filed on Feb. 25, 2004, now Pat. No. 7,066,274.

(51) Int. Cl.
*A62C 31/22* (2006.01)
*B64D 45/00* (2006.01)

(52) U.S. Cl. ............................ 169/70; 169/54; 169/62; 169/68; 169/8; 239/54; 239/36; 244/129.2

(58) Field of Classification Search ............ 169/54–70; 239/54, 46; 244/129.2
See application file for complete search history.

(56) References Cited

U.S. PATENT DOCUMENTS

| 4,643,260 | A | * | 2/1987 | Miller | 169/46 |
| 4,646,848 | A | * | 3/1987 | Bruensicke | 169/62 |
| 5,025,222 | A | | 6/1991 | Scott et al. | |
| 5,038,867 | A | * | 8/1991 | Hindrichs et al. | 169/62 |
| 5,052,493 | A | * | 10/1991 | Court | 169/9 |
| 5,211,246 | A | * | 5/1993 | Miller et al. | 169/62 |
| 5,551,305 | A | | 9/1996 | Farchi et al. | |
| 5,741,980 | A | | 4/1998 | Hill et al. | |
| 6,412,352 | B1 | | 7/2002 | Evans et al. | |
| 6,434,495 | B1 | | 8/2002 | Kitamura et al. | |
| 6,619,404 | B2 | * | 9/2003 | Grabow | 169/53 |
| 2005/0150663 | A1 | * | 7/2005 | Fabre et al. | 169/43 |

OTHER PUBLICATIONS

International Aviation Safety Association, "Investigation Update Into Fire on Board Air Canada Flight 116", Investigation No. A0200123, May 24, 2002, pp. 1-12. as found on the Internet link: http:IIwww.iasa.com.aulfolderslsr111/AirCanada116.html.*

(Continued)

*Primary Examiner*—James S Hogan
(74) *Attorney, Agent, or Firm*—Perkins Coie LLP

(57) ABSTRACT

A fire-suppression system for use in an aircraft having at least one cargo compartment is disclosed. Methods of suppressing a fire in the cargo compartment are also disclosed. The fire-suppression system, under one aspect of the present invention, can include at least one fire-suppressant vessel, at least one discharge conduit coupled to the at least one fire-suppressant vessel, and a valve arrangement coupled to the fire-suppressant vessel and the discharge conduit. The valve arrangement can have a first setting to discharge a fire suppressant at a first discharge rate after activation of the fire-suppression system, a second setting to discharge the fire-suppressant at a second discharge rate less than the first discharge rate, and a third setting to discharge the fire-suppressant at a third discharge rate greater than the second discharge rate during descent of the aircraft.

7 Claims, 3 Drawing Sheets

OTHER PUBLICATIONS

International Aviation Safety Association, "Investigation Update Into Fire on Board Air Canada Flight 116", Investigation No. A0200123, May 24, 2002, pp. 1012 as found on the internet link: http://www.iasa.com.au/folders/sr111/AirCanada116.html.

* cited by examiner

FIRE-SUPPRESSION SYSTEM FOR AN AIRCRAFT

CROSS-REFERENCE TO RELATED APPLICATION

This application is a divisional of U.S. application Ser. No. 10/786,285, filed Feb. 25, 2004 and incorporated herein in its entirety by reference thereto.

TECHNICAL FIELD

The present invention is directed to fire-suppression systems and, more particularly, to apparatuses and methods for suppressing a fire condition in an aircraft.

BACKGROUND

Current commercial jetliners with cargo compartments have fire-suppression systems as a safety feature in the event of a fire in the cargo compartment. The fire-suppression systems typically disperse Halon 1301 (bromotrifluoromethane—$CF_3Br$) as the suppressant. The conventional fire-suppression systems also have multiple bottles of Halon 1301, each with its own discharge mechanism. In the event of a fire in the cargo compartment, fire suppression is achieved by an initial rapid discharge of Halon into the cargo compartment to establish a minimum Halon concentration of 5% or more by volume in the compartment. This initial high Halon concentration level provides effective and fast initial flame knockdown. Sustained fire suppression against deep-seated fire and conflagrations is achieved by maintaining the Halon concentration in the cargo compartment at or above 3%.

The typical fire-suppression systems on large commercial aircraft achieve the initial high Halon concentration level by very quickly releasing the entire contents of one or more high-rate discharge (HRD) bottles of Halon into the cargo compartment. After the HRD bottle(s) are discharged, the Halon concentration peaks and then slowly decreases toward approximately 5% during a period of approximately 20 minutes. In one fire-suppression system used on a Boeing 747-400, two HRD bottles are immediately emptied into a cargo compartment upon activation of the fire-suppression system. The HRD bottles provide approximately 110 pounds of Halon (55 pounds from each HRD bottle) into the cargo compartment to establish an initially high Halon concentration level, which is intended to slowly drop to at least 5%.

The Halon concentration in the cargo compartment is then maintained by providing a substantially continuous, regulated flow of Halon from a plurality of "metered" bottles over an elongated period of time. The metered bottles begin to discharge at a selected time delay after the HRD bottles are discharged. The metered bottles release Halon over an extended time period so the Halon concentration level is maintained at approximately 5%-7%, at least until the aircraft begins its descent to a safe landing.

When a commercial aircraft descends from a cruise altitude, the cargo compartment undergoes a repressurization. The cargo compartment also typically experiences an increase in a compartment leakage rate due to outflow valve effects. The repressurization and increased leakage rate effectively result in additional air being added into the cargo compartment, which causes the Halon concentration to decrease as the aircraft descends.

The conventional fire-suppression systems compensate for the decrease in Halon concentration during descent by maintaining a higher Halon concentration in the cargo compartment during the cruise phase before the descent phase. Accordingly, the Halon concentration level has room to drop as the aircraft descends, while not dropping below the 3% concentration minimum. For example, the metered bottles provide a continuous flow of Halon into the cargo compartment to maintain an elevated Halon concentration level of over 6% through the majority of the aircraft's flight after activation of the fire-suppression system. The Halon concentration level is maintained at this elevated level to compensate for the Halon concentration drop that will occur during descent of the aircraft to a safe landing. Accordingly, the conventional fire-suppression systems, when activated, must contain enough Halon to maintain the intentionally elevated Halon concentration during the flight time prior to descent. The aircraft, therefore, must carry hundreds of pounds of Halon on each flight to ensure that the fire-suppression system will have enough Halon to meet the minimum Halon concentration level requirements at all times in the event a fire condition occurs in one of the cargo compartments. The weight of the Halon negatively impacts the aircraft's fuel efficiency.

SUMMARY

Aspects of embodiments of the invention are directed to fire-suppression systems for an aircraft. One aspect of the invention includes a fire-suppression system for use in an aircraft having a cargo compartment. The fire-suppression system can include at least one fire-suppressant vessel, at least one discharge conduit coupled to the at least one fire-suppressant vessel, and a valve arrangement coupled to the fire-suppressant vessel and to the discharge conduit. The valve arrangement can have a first setting to discharge fire suppressant at a first discharge rate after activation of the fire-suppression system, a second setting to discharge the fire suppressant at a second discharge rate less than the first discharge rate, and a third setting to discharge the fire suppressant at a third discharge rate greater than the second discharge rate during descent of the aircraft.

Another aspect of the invention includes a method of suppressing a fire condition in a cargo compartment of an aircraft. The method can include detecting a fire condition in the cargo compartment, delivering fire suppressant into the cargo compartment at a first discharge rate after detection of the fire condition, delivering fire suppressant into the cargo compartment at a second discharge rate less than the first discharge rate, and delivering fire suppressant into the cargo compartment at a third discharge rate greater than the second discharge rate during descent of the aircraft.

DETAILED DESCRIPTION

The following disclosure describes fire-suppression systems for use in a cargo compartment of an aircraft. Certain specific details are set forth in the following description and in FIGS. 1-3 to provide a thorough understanding of various aspects and embodiments of the invention. Other details describing well-known structures and systems often associated with aircraft, including cargo compartments, smoke detection and warning systems, and fire-suppression systems, are not set forth in the following description to avoid unnecessarily obscuring the description of the various embodiments of the invention.

Many of the details, dimensions, and other specifications shown in the figures are merely illustrative of particular embodiments of the invention. Accordingly, other embodiments can have other details, dimensions, and specifications without departing from the spirit or scope of the present invention. In addition, other embodiments of the invention may be practiced without several of the details described below.

Figure 1:
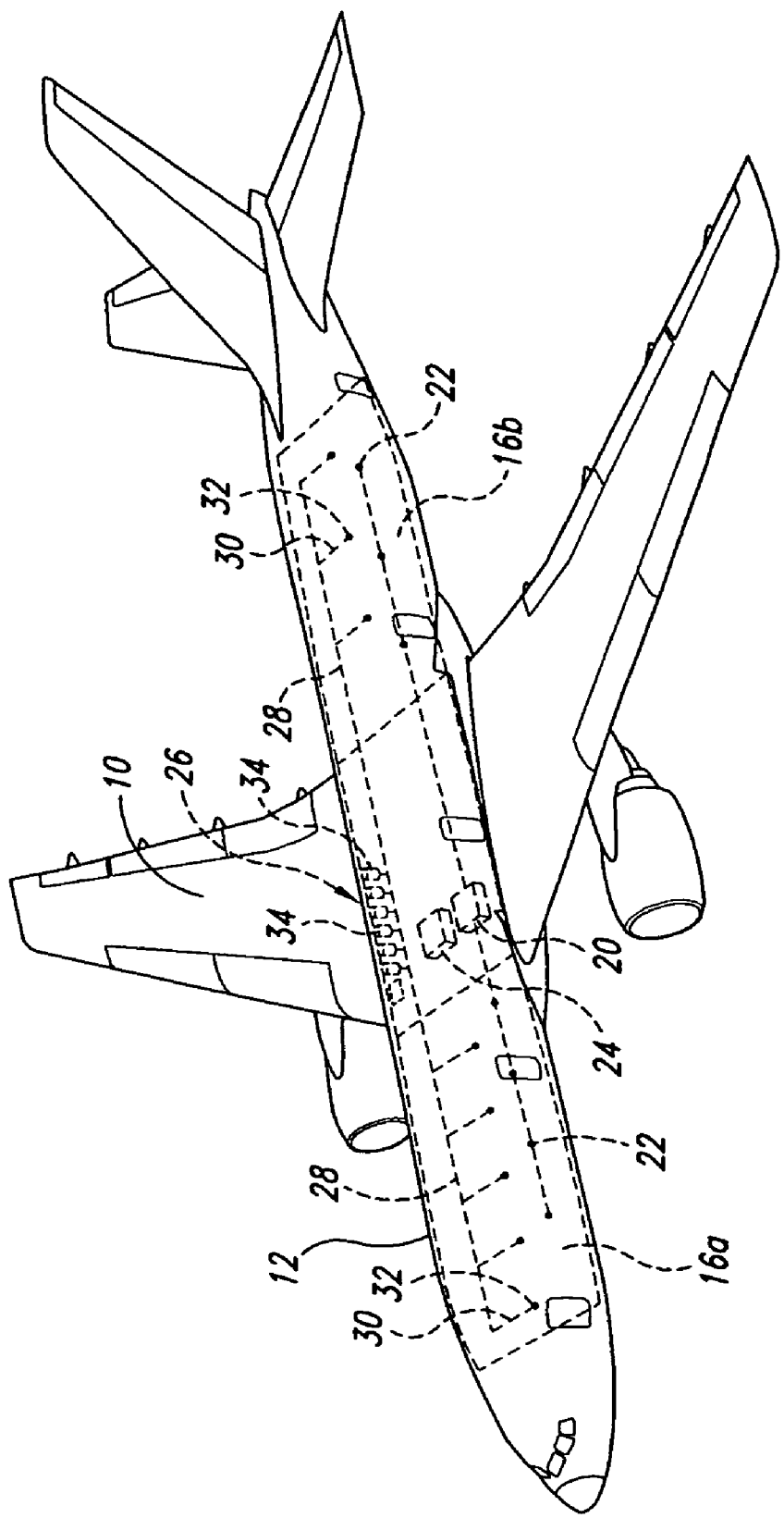
FIG. 1 is a schematic top isometric view of an aircraft with a cargo compartment and a fire-suppression system in accordance with one embodiment of the present invention.

FIG. 1 is a schematic top isometric view of an aircraft 10 with a fuselage 12 that contains cargo compartments, including a forward cargo compartment 16a and an aft cargo compartment 16b. The cargo compartments 16a and 16b are sized to receive cargo containers or pallets (not shown) that can include a vast assortment of different items, containers, and materials. A conventional fire detection system 20 (shown schematically) is provided in the cargo compartments 16a and 16b. The fire detection system 20 includes a plurality of detectors 22 configured to provide a signal to an aircraft control system 24 (shown schematically) upon detecting an actual or potential fire condition in one or both of forward and aft cargo compartments 16a and 16b. For purposes of clarity, the cargo compartment in which a fire condition is detected will be referred to in the following disclosure as "the target compartment 16." The control system 24 is configured to provide a warning to the operator of the aircraft 10 in the event at least one of the detectors 22 is activated in the target compartment 16.

The aircraft 10 also includes a fire-suppression system 26 in accordance with at least one embodiment of the invention. The fire-suppression system 26 is coupled to the control system 24 and is activated manually or automatically by the control system if a fire condition is detected. The fire-suppression system 26 is configured to disperse a fire suppressant, such as Halon 1301, into the target compartment 16. The fire suppressant is initially dispersed into the target compartment 16 at elevated levels to extinguish any flame that may be present in the target compartment 16. The fire suppressant is also dispersed into the target compartment 16 over an extended period of time after the initial fire suppressant dispersal to maintain a selected fire suppressant concentration level that prevents any subsequent flare-ups. As the aircraft 10 begins its descent toward a safe landing, the amount of fire suppressant dispersed into the target compartment 16 is increased, thereby maintaining the selected fire suppressant concentration level throughout the descent.

The fire-suppression system 26 in accordance with one embodiment of the present invention includes a main line 28 that carries a flow of fire suppressant to the target compartment 16. The flow of fire suppressant through the main line 28 can be directed to the target compartment 16, whether it is the forward cargo compartment 16a or the aft cargo compartment 16b, in response to a command from the pilot or from an automatic command from the control system 24.

A plurality of distributing lines 30 branch off from the main line 28 and are spaced apart from each other within the forward and aft cargo compartments 16a and 16b. Each of the distributing lines 30 terminates at a discharge nozzle 32 configured to disperse the fire suppressant into the respective forward cargo compartment 16a or the aft cargo compartment 16b. The distributing lines 30 and the discharge nozzles 32 are positioned so that, when the fire-suppression system 26 is activated, the fire suppressant will be dispersed substantially uniformly to rapidly achieve a uniform concentration of fire suppressant throughout the target compartment 16.

Figure 2:
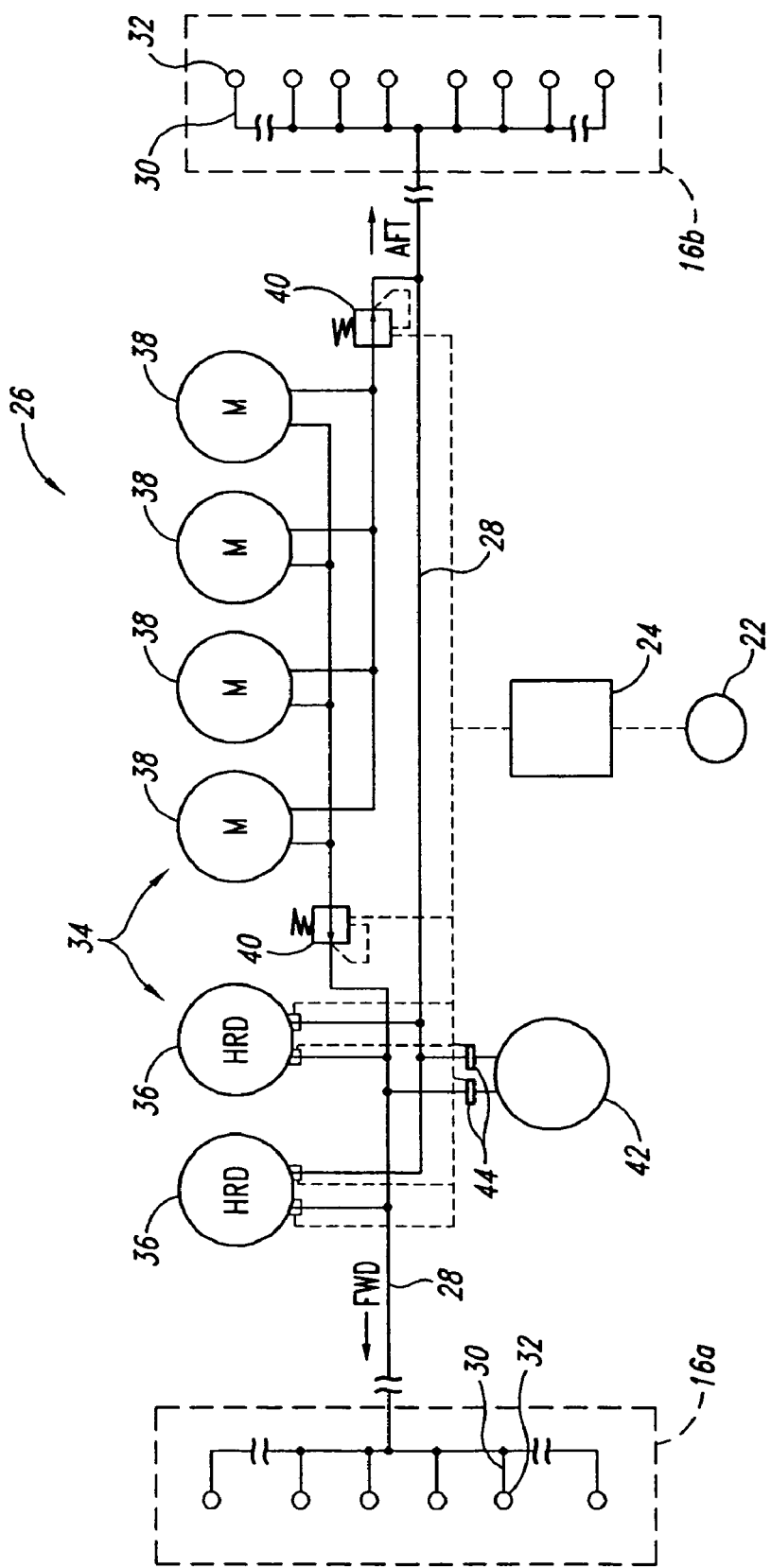
FIG. 2 is a schematic view of the fire-suppression system of FIG. 1.

As best seen in FIG. 2, the main line 28 is connected to a plurality of pressurized bottles 34 that contain the fire suppressant. In other embodiments, the bottles 34 may contain Halon 1301 as the fire suppressant material, although fire suppressants other than Halon 1301 can be distributed through the main line 28, the distributing lines 30, and the discharge nozzles 32 into the target compartment 16. The bottles 34 of the illustrated fire-suppression system 26 include two high-rate discharge (HRD) bottles 36 coupled to the main line 28. In the illustrated embodiment, the fire suppressant is Halon 1301 and each HRD bottle 36 contains approximately 55 pounds of Halon 1301. Other embodiments can utilize HRD bottles 36 containing more or less fire suppressant per bottle. The HRD bottles 36 are configured to quickly discharge the fire suppressant into the main line 28 for delivery to the target compartment 16 when the fire-suppression system 26 is activated.

The HRD bottles 36 of the illustrated embodiment have valve mechanisms with a valve setting that allows the bottles to fully discharge into the main line 28 over a very short period of time (e.g., 2-3 minutes) as soon as the fire-suppression system 26 is activated. The fire suppressant from the HRD bottles 36 is distributed through the main line 28 and the distributing lines 30 and is dispersed from the discharge nozzles 32 throughout the target compartment 16. The HRD bottles 36 in one embodiment delivers enough Halon into the target compartment 16 to provide an initial elevated concentration by volume of fire suppressant that peaks at approximately 5%-30% or more. The volume and concentration levels of the fire suppressant can be different in other embodiments, including embodiments using a fire suppressant other than Halon.

The high initial concentration level of fire suppressant extinguishes any flames that may be in the target compartment 16. After the fire suppressant from the HRD bottles 36 is rapidly dispersed to suppress or extinguish any flames, no additional fire suppressant is added to the target compartment 16 for a selected time period (e.g., 18 minutes). During this time period, the fire suppressant concentration in the target compartment 16 is allowed to slowly drop to a predetermined acceptable level. For example, when the fire suppressant is Halon, the concentration is allowed to drop to the range of approximately 5%-9%, inclusive.

The bottles 34 in the fire-suppression system 26 also include a plurality of metered bottles 38 coupled to the main line 28 and also to the aircraft's control system 24. Each of the metered bottles 38 of the illustrated embodiment contains approximately 80 pounds of Halon 1301 as the fire suppressant, although pressurized containers can be used that contain more or less fire suppressant. The metered bottles 38 are activated at a selected time by the control system 24 to dispense the fire suppressant into the target compartment 16 at a controlled discharge rate over an elongated period of time. The discharge rate of the fire suppressant from the metered bottles 38 is substantially less than the discharge rate of the fire suppressant from the HRD bottles 36. In one embodiment, the metered bottles 38 are activated approximately 20 minutes after activation of the fire-suppression system 26. Accordingly, the flow of fire suppressant from the metered bottles 38 is dispersed into the main line 28 and to the target compartment 16 after the HRD bottles 36 have been substantially emptied.

The metered bottles 38 are coupled to at least one regulator 40 that controls the flow of fire suppressant to the target compartment 16. In the illustrated embodiment, one regulator 40 controls the flow of fire suppressant toward the forward cargo compartment 16a, and another regulator controls the flow of fire suppressant to the aft cargo compartment 16b. The regulators 40 provide a substantially continuous, metered flow of Halon to the target compartment 16 as the aircraft is flying along a cruise phase prior to descent toward a safe landing area.

In one embodiment wherein the fire suppressant is Halon, the metered bottles 38 and the regulators 40 can be configured to provide a flow of Halon into the target compartment 16 for up to 420 minutes or more while maintaining the Halon concentration level above 3%. In one embodiment, the metered bottles 38 provide Halon into the target compartment 16 to maintain a fire suppressant concentration level in the range of approximately 3.5%-4%, inclusive, after activation of the fire-suppression system 26 and prior to descent of the aircraft toward landing.

In one embodiment, the metered bottles 38 and the regulators 40 are configured with a setting to provide 0.9 pounds of Halon per minute into the target compartment 16. Other embodiments can provide greater or fewer metered bottles 38 and regulators 40 or other flow restricting devices with valve settings that provide a flow of Halon greater or less than 0.9 pounds per minute, so as to maintain the concentration of Halon within the cargo compartment above the 3% minimum during at least the cruise phase and prior to descent of the aircraft.

The fire-suppression system 26 of the illustrated embodiment also includes at least one supplemental bottle 42 of fire suppressant coupled to the main line 28. One or more flow restricting devices 44 are provided between the supplemental bottle 42 and the main line 28 to control the flow of fire suppressant from the supplemental bottle toward the target compartment 16. The restriction devices 44 can include regulators or other flow control devices. The supplemental bottle 42 and the restriction devices 44 are coupled to the aircraft's control system 24 and are configured to be activated to disperse additional fire suppressant into the target compartment 16 as the aircraft 10 (FIG. 1) begins to make its descent toward landing.

When the supplemental bottle 42 is activated in one embodiment, fire suppressant from the supplemental bottle is directed into the main line 28 and is added to the flow of fire suppressant from the metered bottles 38 flowing toward the target compartment 16. Accordingly, fire suppressant is added to the target compartment 16 at a greater rate during the descent phase as compared to the rate at which the fire suppressant is delivered from the metered bottles 38 alone prior to descent. In another embodiment, the entire flow of fire suppressant to the target compartment 16 is only provided from one or more supplemental bottles 42 during descent. Accordingly, the flow rate of fire suppressant from the one or more supplemental bottles 42 can be greater than the flow rate of fire suppressant from the metered bottles 38. In a further aspect of this embodiment, the flow rate of fire suppressant from the supplemental bottle 42 is less than the flow rate from the HRD bottles 36.

In the illustrated embodiment, the fire-suppression system 26 is configured so the supplemental bottle 42 begins to disperse the fire suppressant at approximately the initiation of the aircraft's descent toward a safe landing area. The supplemental bottle 42 contains enough fire suppressant to be dispersed into the target compartment 16 for up to approximately 20 minutes, which corresponds to the duration of an aircraft's typical descent.

As the aircraft 10 (FIG. 1) descends, the forward and aft cargo compartments 16a and 16b are repressurized, which results in air being adding into the cargo compartments. The forward and aft cargo compartments 16a and 16b may also experience increased compartment leakage because of the outflow valve effects during descent. Accordingly, adding additional air through repressurization and losing fire suppressant through increased leakage would ordinarily result in a decrease in the fire suppressant concentration level within the target compartment 16 if the discharge rate of fire suppressant into the target compartment were not increased. The supplemental bottle 42 provides an increased discharge rate of fire suppressant into the target compartment 16 to maintain the fire suppressant concentration above the 3% minimum during the entire descent to counteract the decrease in concentration that would otherwise result.

The supplemental bottle 42 of the illustrated embodiment contains approximately 55 pounds of Halon and provides a flow of Halon lasting for approximately 20 minutes during the aircraft's descent. Accordingly, as an example, the flow of Halon from the supplemental bottle 42 provides an increased discharge rate of Halon during the descent phase so the Halon concentration level in the aft cargo compartment 16b remains in the range of approximately 3.5%-4%, inclusive. In one embodiment, the supplemental bottle 42 adds an additional 1.1 pound per minute of Halon 1301 flowing to the target compartment 16 during descent. In other embodiments, the supplemental bottle 42 can provide more or less additional fire suppressant at greater or lesser flow rates.

The fire-suppression system 26 of the illustrated embodiment is configured so the supplemental bottle 42 is activated either automatically or in response to a operator's command at approximately the beginning of the aircraft's descent. In other embodiments, the fire-suppression system 26 can be configured to activate the supplemental bottle 42 at a trigger point other than at the beginning of the aircraft's descent. For example, the supplemental bottle 42 can be activated based upon the aircraft's altitude, the aircraft's descent rate, the temperature in the target compartment 16, or other triggering event.

The supplemental bottle 42 in the fire-suppression system 26 is configured to provide the extra fire suppressant into the target compartment 16 when needed during the descent phase to compensate against a concentration drop resulting from the concurrence of increased air pressure and compartment leakage. Accordingly, excessive amounts of Halon do not need to be provided into the target compartment 16 for an extended time period prior to descent to maintain an overly high concentration level that can compensate for a drop in the fire suppressant level during the descent. Therefore, less fire suppressant needs to be carried in the fire-suppression system 26, which provides significant weight and cost savings for the aircraft.

Figure 3:
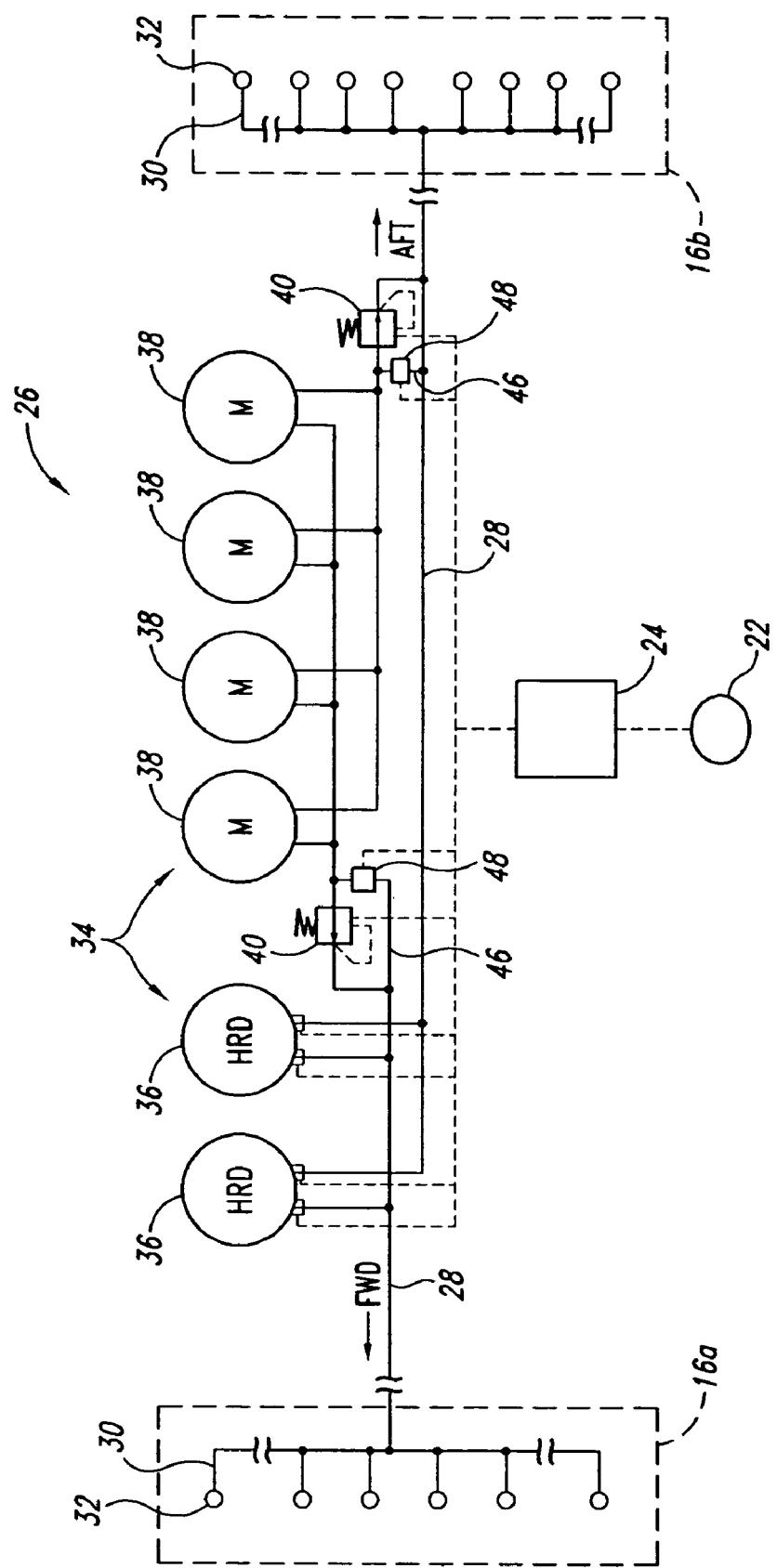
FIG. 3 is a schematic view of a fire-suppression system in accordance with another embodiment of the present invention.

In another embodiment, shown in FIG. 3, the supplemental bottle 42 can be eliminated and its function carried out by the regulators 40 and the metered bottles 38. The regulators 40 control the fire-suppressant flow rate from the metered bottles 38, which is substantially less than the fire-suppressant flow rate from the HRD bottles 36. In this embodiment, a bypass line 46 is provided between the metered bottles 38 and the main line 28. The bypass line 46 allows at least a portion of the fire suppressant from the metered bottles 38 to bypass the regulators 40 and flow toward the target compartment 16 at an increased flow rate.

At least one restriction device 48 can be connected to the bypass line 46 and configured to provide a fire-suppressant flow rate to the main line 28 greater than the fire-suppressant flow rate through the regulators 40 but less than the flow rate from the HRD bottles 36. The restriction device 48 can be a regulator, a flow diverter, an adjustable flow valve, or other flow control device. The restriction device 48, when activated, allows a flow of fire suppressant from the metered bottles 38 to bypass the regulators 40, so an increased flow of fire suppressant is carried through the main line 28 and delivered to the target compartment during the aircraft's descent phase.

The restriction device 48 can be activated automatically or in response to a command from the operator. The restriction device 48 can be activated at a trigger point corresponding to, for example, a selected amount of time after activation of the fire-suppression system 26, at the initiation of the aircraft's descent phase, at a selected altitude, at a selected descent rate, or at another selected trigger point. Accordingly, additional fire suppressant is provided into the target compartment 16 during the aircraft's descent phase to maintain the fire suppressant concentration at a generally constant level throughout the descent.

When the fire-suppression system 26 of the foregoing embodiment is activated in response to an actual or potential fire condition in the forward or aft cargo compartment 16a and 16b, the fire suppressant from the HRD bottles 36 is quickly discharged and dumped into the target compartment 16, as discussed above. Approximately 20 minutes after the activation of the HRD bottles 36, the metered bottles 38 are activated. Fire suppressant from the metered bottles 38 flows through the regulator 40 to provide the metered flow of fire suppressant through the main line 28 to the target compartment 16. The fire suppressant from the metered bottles 38 is dispersed into the target compartment 16 at a selected rate to maintain the fire suppressant concentration above the 3% minimum. In one embodiment wherein the fire suppressant is Halon, the flow of Halon from the metered bottles 38 maintains the Halon concentration in the range of approximately 3.5%-4%, inclusive, over a time period of up to 420 minutes or more.

When the aircraft 10 (FIG. 1) begins its descent phase, the restriction device 48 is activated by the control system 24 to allow fire suppressant from the metered bottles 38 to flow through the bypass line 46 to the main line 28, bypassing the regulators 40. The fire suppressant from the bypass line 46 provides an increased fire-suppressant flow rate to the target compartment 16 as compared to the fire-suppressant flow rate prior to descent and activation of the restricting device 48. Accordingly, increased amounts of fire suppressant from the metered bottles 38 are provided into the target compartment 16 to maintain the fire suppressant concentration in a selected range. When the fire suppressant is Halon, the Halon concentration in the target compartment 16 is maintained in the range of approximately 3.5%-4%, inclusive, and at least above the 3% minimum, during the entire descent phase of the aircraft's flight until landing.

In one embodiment, the restricting device 48 can be sequentially or continuously adjusted to provide an increasing fire-suppressant flow rate into the target compartment 16 during the entire descent of the aircraft 10 (FIG. 1). The fire-suppression system 26 can minimize the amount of fire suppressant needed in the metered bottles 38 to provide the fire-suppression protection required for the aircraft's forward and aft cargo compartments 16a and 16b.

In still another embodiment, the regulators 40 in this embodiment can include one or more adjustable devices controlled by the control system 24 or another controlling device. The regulators 40 can be adjusted at selected times during an actual or potential fire condition to change the fire-suppressant flow rate to the target compartment 16. The regulators 40 can be adjusted prior to or during descent of the aircraft, so the fire-suppressant flow rate is sequentially or substantially continuously increased throughout the descent phase.

In another embodiment, the multiple bottles of fire suppressant and multiple regulators or restriction devices can be eliminated and their functions carried out by a single tank or container of fire suppressant and a valve arrangement that controls the fire-suppressant flow rate into the target compartment 16. The valve arrangement can then be adjusted to provide a high flow rate of fire suppressant into the target compartment 16 immediately after activation of the fire-suppression system 26. The valve arrangement can be adjusted to reduce the fire-suppressant flow rate during the aircraft's cruise phase for efficient distribution of the fire suppressant. The valve arrangement can also be adjusted at a selected time, such as at the beginning of the aircraft's descent, to increase the fire-suppressant flow rate throughout the aircraft's descent until landing. Accordingly, the fire suppressant concentration is maintained at a generally constant level during descent, thereby compensating for the effects of repressurization and increased leakage in the target compartment The fire-suppression system 26 of the embodiment discussed above provide benefits over the prior art. As an example, the fire-suppression system 26 is configured to provide increasing amounts of fire suppressant into the target compartment 16 only when needed to maintain the fire suppressant concentration within a selected range to compensate for the effects of pressurization and increased leakage in the target compartment. Accordingly, reduced amount of fire suppressant can be efficiently dispersed into the target compartment 16 as needed to maintain the fire suppressant concentration at or slightly above a selected minimum during the cruise and descent phases of the aircraft's flight. The fire-suppression system 26, therefore, provides highly desirable cost and weight savings for the aircraft because excessive fire suppressant need not be carried by the fire-suppression system 26.

From the foregoing, it will be appreciated that specific embodiments of the invention have been described herein for purposes of illustration, but that various modifications may be made without deviating from the spirit and scope of the invention. For example, aspects of the systems and methods described above or the context of particular embodiments can be combined or eliminated in other embodiments. Many of the foregoing embodiments were described in the context of particular fire suppressant, particular suppressant concentration levels, particular flow rates and particular capacities. In other embodiments, any of the foregoing systems can be configured to handle different fire suppressants, maintain different fire suppressant concentrations, deliver different flow rates and/or share different capacities of fire suppressants. Accordingly, the invention is not limited except as by the appended claims.

I claim:

1. An aircraft, comprising
   a fuselage having a cargo compartment;
   a fire-detection system coupled to the cargo compartment and activatable upon detection of a fire condition; and
   a fire-suppression system coupled to the fire-detection system and to the cargo compartment, the fire-suppression system comprising:
      at least one fire-suppressant vessel;

a discharge conduit coupled to the at least one fire-suppressant vessel; and a valve arrangement coupled to the at least one fire-suppressant vessel and the discharge conduit, the valve arrangement having a first setting to discharge a fire suppressant to the compartment at a first discharge rate upon activation of the fire-suppression system, a second setting to discharge the fire suppressant to the compartment at a second discharge rate less than the first discharge rate, and a third setting to discharge the fire suppressant to the compartment at a third discharge rate greater than the second discharge rate during descent of the aircraft.

2. The aircraft of claim 1, further comprising a first container containing at least a first portion of the fire suppressant, a second container containing at least a second portion of the fire suppressant, and a third container containing at least a third portion of the fire suppressant.

3. The aircraft of claim 1 wherein the fire-suppressant vessel contains Halon.

4. The aircraft of claim 1 wherein the valve arrangement is configured to discharge the fire suppressant at the first discharge rate over a first period of time, to discharge the fire suppressant at the second discharge rate over a second period of time greater than the first period of time, and to discharge the fire suppressant at the third discharge rate over a third period of time less than the second period of time.

5. The aircraft of claim 1 wherein the valve arrangement includes a first flow control device coupled to the discharge conduit to control a flow of the fire suppressant at the second discharge rate, and a second flow control device coupled to the discharge conduit to control at least a portion of a flow of the fire suppressant for dispersal at the third discharge rate.

6. An aircraft, comprising:
a fuselage having a cargo compartment; and
a fire-suppression system coupled to the cargo compartment, the fire-suppression system comprising:
means for containing a fire suppressant;
means for carrying a flow of the fire suppressant to the cargo compartment from the means for containing; and
a means for controlling the flow of fire suppressant for discharge into the cargo compartment, the means for controlling having a first setting to discharge the fire suppressant at a first discharge rate, a second setting for discharging the fire suppressant into the compartment at a second discharge rate greater than the first rate, and a third setting for discharging the fire suppressant into the compartment at a third discharge rate greater than the second discharge rate during descent of the aircraft.

7. An aircraft, comprising
a fuselage having a cargo compartment;
a warning system coupled to the cargo compartment and activatable for a flight portion having an initial phase, an intermediate phase, and a descent phase; and
a fire-suppression system coupled to the warning system and to the cargo compartment, the fire-suppression system having:
at least one fire-suppressant vessel containing fire suppressant;
a first flow restricting device coupled to the fire-suppressant vessel and configured to control discharge of the fire suppressant into the compartment at a first discharge rate;
a second flow restricting device coupled to the fire-suppressant vessel and configured to control discharge of the fire suppressant into the compartment at a second discharge rate less than the first discharge rate; and
a third flow restricting device coupled to the fire-suppressant vessel and configured to control discharge of the fire suppressant into the compartment at a third discharge rate less than the first discharge rate and greater than the second discharge rate.

* * * * *